(12) United States Patent
Yamanaka et al.

(10) Patent No.: US 7,540,737 B2
(45) Date of Patent: Jun. 2, 2009

(54) APPARATUS FOR PRODUCING BOTTLE-TYPE SYNTHETIC RESIN CONTAINERS

(75) Inventors: Koji Yamanaka, Akou (JP); Yoshihiro Iimura, Matsudo (JP); Daisuke Uesugi, Matsudo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 119 days.

(21) Appl. No.: 11/902,761

(22) Filed: Sep. 25, 2007

(65) Prior Publication Data
US 2008/0031993 A1 Feb. 7, 2008

Related U.S. Application Data

(62) Division of application No. 10/482,120, filed as application No. PCT/JP02/06516 on Jun. 27, 2002, now Pat. No. 7,306,760.

(30) Foreign Application Priority Data
Jun. 29, 2001 (JP) ............................. 2001-199130

(51) Int. Cl.
*B29C 49/68* (2006.01)
(52) U.S. Cl. .................................. 425/174.4; 425/526
(58) Field of Classification Search ................. 425/143, 425/174.4, 526
See application file for complete search history.

(56) References Cited

U.S. PATENT DOCUMENTS

| | | |
|---|---|---|
| 3,562,372 A | 2/1971 | Schjeldahl et al. |
| 3,889,039 A | 6/1975 | Wainer |
| 4,318,882 A | 3/1982 | Agrawal et al. |
| 4,375,442 A | 3/1983 | Ota et al. |
| 4,476,084 A | 10/1984 | Takada et al. |
| 4,836,971 A | 6/1989 | Denis et al. |
| 4,846,656 A | 7/1989 | Denis et al. |
| 4,933,135 A | 6/1990 | Horwege et al. |
| 5,540,868 A | 7/1996 | Stouffer et al. |

(Continued)

FOREIGN PATENT DOCUMENTS

EP  0 868 989 A2  10/1998

(Continued)

OTHER PUBLICATIONS

Partial machine translation of JP2004009633A printed Jan. 2004 obtained from the JPO website.*

(Continued)

*Primary Examiner*—Robert B Davis
(74) *Attorney, Agent, or Firm*—Oliff & Berridge, PLC

(57) ABSTRACT

A method for producing bottle-type containers made of a synthetic resin, e.g., polyethylene-terephthalate resin, includes a heat treatment step for heating and crystallizing a neck portion of a perform corresponding to a neck portion of a container. In a first stage of the heat treatment step, the neck portion of the perform is temporarily heated to a temperature below a melting point of the synthetic resin, e.g., approximately 200° C. to 230° C. in the case of polyethylene terephthalate resin. In a subsequent second stage, the neck portion is maintained at a temperature within a range in which crystallization of the synthetic resin is promoted, e.g. approximately 170° C. to 195° C. in the case of polyethylene terephthalate resin.

10 Claims, 2 Drawing Sheets

U.S. PATENT DOCUMENTS

| | | |
|---|---|---|
| 5,614,145 A | 3/1997 | O'Kane |
| 6,168,740 B1 | 1/2001 | Koch et al. |
| 2006/0157896 A1* | 7/2006 | Lee et al. .................... 264/345 |

FOREIGN PATENT DOCUMENTS

| | | | | |
|---|---|---|---|---|
| JP | A 60-000927 | | | 1/1985 |
| JP | A 61-079627 | | | 4/1986 |
| JP | 63176129 A | * | | 7/1988 |
| JP | A 02-034321 | | | 2/1990 |
| JP | A 02-209219 | | | 8/1990 |
| JP | A 09-239852 | | | 9/1997 |
| JP | A 11-235751 | | | 8/1999 |
| JP | 2004009633 A | * | | 1/2004 |

OTHER PUBLICATIONS

Callister, William D., Materials Science and Engineering: An Introduction, John Wiley & Sons, Inc. Third Edition, 1994, pp. 288-291.

Young, R.J. and P.A. Lovell, Introduction to Polymers, Chapman & Hall, Second Edition, 1991, pp. 276-280.

Young, R.J. and P.A. Lovell, Introduction to Polymers, Chapman & Hall, 1991, pp. 276-287.

McGraw-Hill Dictionary of Scientific and Technical Terms, Fifth Edition, McGraw-Hill, Inc., 1994, p. 911.

* cited by examiner

APPARATUS FOR PRODUCING BOTTLE-TYPE SYNTHETIC RESIN CONTAINERS

This is a Division of application Ser. No. 10/482,120 filed Aug. 3, 2004 and now U.S. Pat. No. 7,306,760, which in turn is a National Stage of PCT/JP02/06516 filed Jun. 27, 2002. The disclosure of the prior applications is hereby incorporated by reference herein in its entirety.

BACKGROUND

1. Technical Field

The present invention relates to a method and an apparatus for producing bottle-type synthetic resin containers, and, in particular, provides a production technology that allows crystallization step for the neck portion of such container to be performed in a short time.

2. Prior Art

In bottle-type synthetic resin containers, in order to improve the heat resistance and durability at the neck portion of the container, it is known to heat and crystallize the neck portion of the corresponding perform. As opposed to the body portion of the container in which molecules are oriented by biaxial stretching blow molding to preserve transparency, the neck portion subjected to crystallization treatment has a crystal structure in which sphaerites are grown to undergo devitrification into white or milky-white color. A method for producing such bottle-type container is more fully disclosed, e.g., in U.S. Pat. No. 4,375,442.

Crystallization of synthetic resin occurs when the resin is heated under a temperature condition not lower than its glass transition temperature. Generally, in the case of polyethylene terephthalate (PET) resin, crystallization is carried out by heating the neck portion of the preform to a temperature not lower than approximately 120° C. for a predetermined duration and, it is possible to increase the crystallizing speed when heating is performed within a temperature range of approximately 170° C. to 190° C.

However, in the conventional crystallizing process, because the temperature of the neck portion of the preform is elevated immediately after starting the heating to the above-mentioned crystallizing temperature range gradually, a relatively long time is required until crystallization starts, thereby imposing a limitation to improve the productivity.

DISCLOSURE OF THE INVENTION

The present invention has been conceived in view of the above-mentioned problems, and it is a primary object of the present invention to provide a production technology for bottle-type synthetic resin containers, wherein crystallization step for the neck portion of the container can be carried out in a relatively short time.

To this end, according to the present invention, there is provided a method for producing bottle-type synthetic resin containers, including a heat treatment step for heating and crystallizing a neck portion of a perform corresponding to a neck portion of a container, wherein said heat treatment step comprises a first stage in which said neck portion of the perform is temporarily heated to a temperature below a melting point of the synthetic resin, and a second stage in which said neck portion is subsequently maintained at a temperature within a range in which crystallization of the synthetic resin is promoted.

The present invention further provides an apparatus for producing bottle-type synthetic resin containers, comprising a heat treatment means for heating and crystallizing a neck portion of a perform corresponding to a neck portion of a container, wherein said heat treatment means is operated in a first stage so that said neck portion of the perform is temporarily heated to a temperature below a melting point of the synthetic resin, and in a second stage so that said neck portion is subsequently maintained at a temperature within a range in which crystallization of the synthetic resin is promoted.

Thus, according to the present invention, upon production of bottle-type synthetic resin containers, wherein the neck portion of a preform is heated and crystallized, the neck portion of the perform is temporarily heated to a temperature below a melting point of the synthetic resin, e.g., approximately 200° C. to 230° C. in the case of polyethylene-terephthalate resin, and is subsequently maintained at a temperature within a range in which crystallization of the synthetic resin is promoted, e.g., approximately 170° C. to 195° C. in the case of polyethylene-terephthalate resin. Therefore, it is possible to shorten the time required for reaching a temperature range in which crystallization is promoted with a stable environmental temperature state of the neck portion, and, hence to shorten the time required for the crystallization treatment of the neck portion, thereby allowing a significant improvement in productivity.

For carrying out the present invention, it is preferred that the heat treatment step is performed by a heater having a heating output that is controlled to a relatively high level in the first stage of the heat treatment, and to a relatively low level in the second stage. In this instance, it is readily possible to realize an optimum temperature control for crystallizing the neck portion in a relatively short time, by a control of the heating output of the heater.

In the second stage of the heat treatment, it is preferred that air shower is applied to an outer surface at the neck portion of the preform, in the second stage of the heat treatment. In this instance, in addition to the heating output control of the heater, the temperature of the neck portion in the second stage can be readily maintained to an optimum value by a flow rate control of the air from the air nozzle, thereby allowing minimization of the loss time.

Upon application of air shower, it is preferred to prevent flow of air into the neck portion of the preform by a shield that covers an opening of the neck portion. In this instance, it is possible to reduce the temperature difference between the outer and inner surfaces of the neck portion, thereby suppressing formation of wrinkles or the like surface defects in the opening of the neck portion.

BRIEF DESCRIPTION OF THE DRAWINGS

The present invention will be more fully explained below with reference to preferred embodiment shown in the accompanying drawings.

BEST MODE FOR CARRYING OUT THE INVENTION

According to the present invention, bottle-type containers made of crystalline thermoplastic synthetic resin, such as polyethylene terephthalate resin, are produced by using a preform that corresponds to the container, subjecting the body portion of the preform to a biaxial stretching blow molding within a mold, and heating and thereby crystallizing the neck portion of the preform. Such a production method is more fully described in the above-mentioned U.S. Pat. No. 4,375,442, the disclosure of which is herein incorporated by reference.

Figure 1:
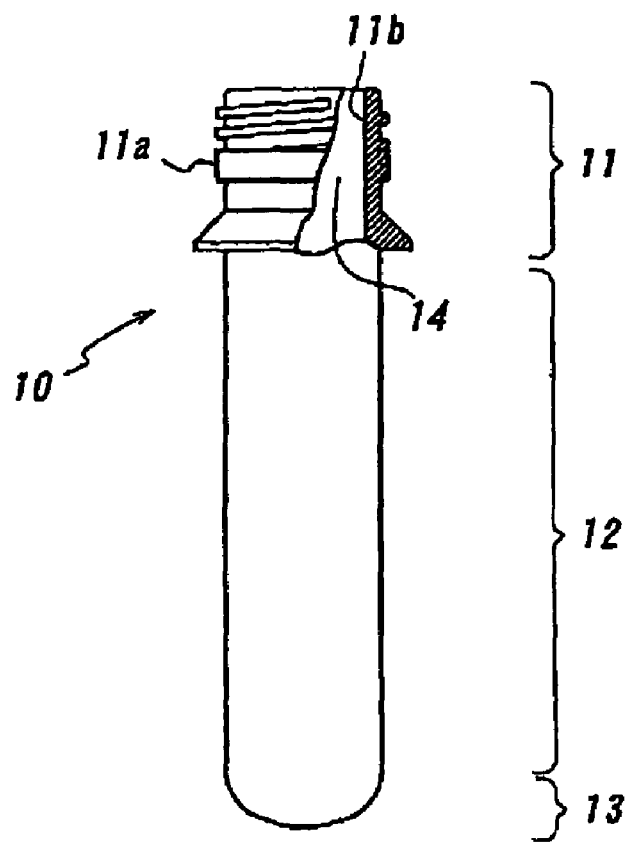
FIG. 1 is a front view, partially in section, of a preform used for producing bottle-type synthetic resin container.

As shown in FIG. 1, the preform 10 is prepared by an injection molding or extrusion molding of a crystalline thermoplastic synthetic resin, and includes a neck portion 11, a body portion 12 and a bottom portion 13. The neck portion 11 has an opening 14 as a spout of the container, and is provided with a thread on the outer surface 11a while its inner surface 11b is made flat.

Figure 2:
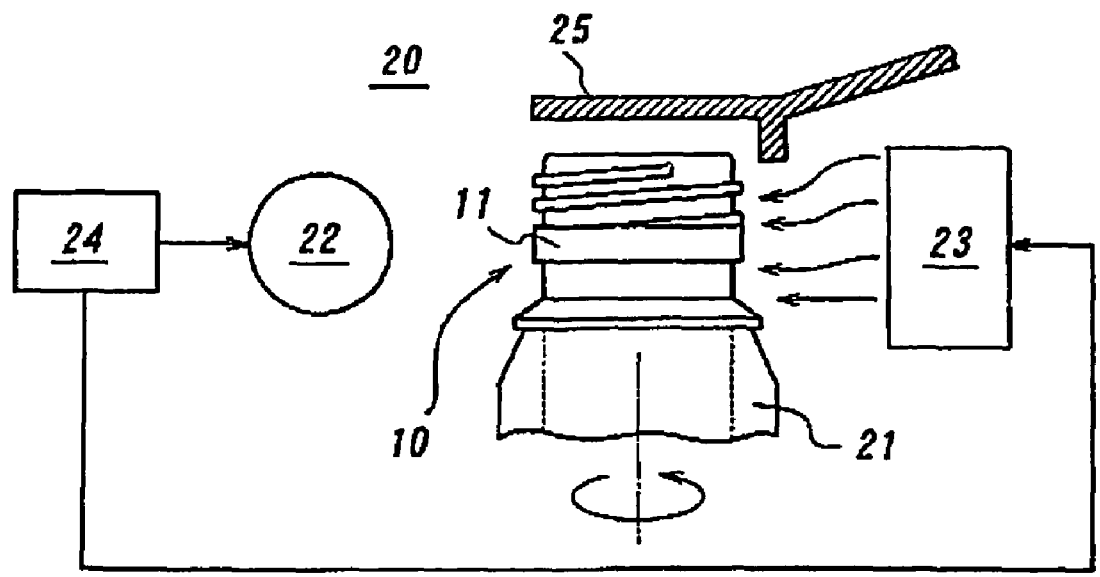
FIG. 2 is a schematic view showing an example of heat treating device for performing crystallization of the neck portion, when carrying out the production method according to the present invention.

The crystallization treatment of the neck portion 11 of the preform 10 is carried out by a heat treatment device 20 as shown in FIG. 2, e.g., before the bidirectional stretch blow molding of the preform 10. The heat treatment device 20 includes a substantially cylindrical holder 21 that is rotatable about a vertical center axis, as shown by arrow in FIG. 2. The holder 21 serves to detachably hold the preform 10 and surrounds the body portion 12 and the bottom portion 13 of the preform 10, with the neck portion 11 exposed. At a position opposite to the neck portion 11 that projects from the holder 21, a heater 22 is arranged on one side and an air nozzle 23 is arranged on the other side. The heater 22 may be comprised of a near-infrared heater or far-infrared heater. Preferably, the air nozzle 23 has an orifice of a linear cross-section that extends in parallel with the center axis of the preform 10. A controller 24 serves to automatically control the heater 22 and the air nozzle 23. Moreover, immediately above the neck portion 11 that projects from the holder 21, a shield 25 is arranged to cover the opening 14 of the neck portion 11. Preferably, the shield 25 functions as a shroud for properly guiding the flow of air shower from the air nozzle 23.

With the heat-treatment device 20 shown in FIG. 2, the heater 22 is operated while rotating the holder 21 with the preform 10 held thereby, so as to heat the neck portion 11 of the preform 10, which projects from the holder 21. Also, if necessary, air shower is ejected from the air nozzle and applied to the outer surface 11a of the neck portion 11, so as to allow the surface temperature of the neck portion 11 to be maintained within a predetermined range to be described hereinafter. Incidentally, the shield 25 covering the opening 14 of the neck portion 11 serves to prevent air from flowing into the neck portion 11 of the preform 10, so as to reduce the temperature difference between the outer surface 11a and the inner surface 11b of the neck portion 11.

Figure 3:
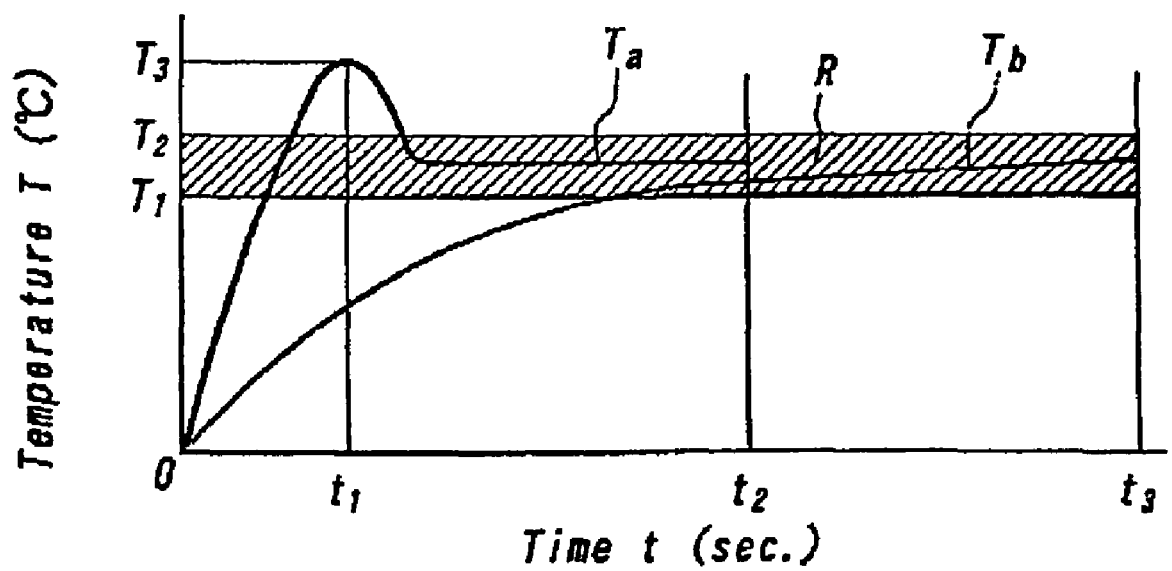
FIG. 3 is a timing chart schematically showing the temperature change at the neck portion.

FIG. 3 is a timing chart schematically showing the change in surface temperature T of the neck portion 11, wherein the solid line Ta shows the temperature change in the crystallization treatment according to the present invention, and the imaginary line Tb shows the temperature change in the conventional crystallization treatment.

According to the present invention, as shown by the solid line Ta in FIG. 3, the surface temperature T of the neck portion 11 upon heating thereof, is temporarily elevated in the first stage from the starting time of the heating (t=0 to $t_1$), to a temperature $T_3$ that is immediately below the melting point of the synthetic resin forming the preform. In the subsequent second stage (t=$t_1$ to $t_2$), the surface temperature T of the neck portion 11 is lowered to a temperature range R ($T_1 \leq T \leq T_2$) in which crystallization of the synthetic resin can be effectively promoted, and is maintained to be within such temperature range R so as to promote and complete crystallization.

In contrast, it has been a conventional practice that, as shown by the imaginary line Tb in FIG. 3, the surface temperature T of the neck portion 11 upon heating thereof, is gradually elevated from the starting time of the heating (t=0), to the above-mentioned temperature range R, in a monotonous manner. As a result, the time point t=$t_3$ corresponding to completion of the crystallizing treatment is delayed from the completion time point t=$t_2$ according to the present invention. In other words, according to the present invention, it is possible to shorten the time required for crystallization treatment by an amount $\Delta t = t_3 - t_2$, as compared to the conventional process.

to be more specific, when the preform 10 is comprised of polyethylene terephthalate resin, according to the present invention, the surface temperature T of the neck portion 11 is temporarily elevated in the first stage from the starting time of the heating (t=0 to $t_1$), to a temperature $T_3 \cong 220°$ C. that is immediately below the melting point, and then lowered to a temperature range R between $T_2 \cong 190°$ C. and $T_1 \cong 170°$ C. ($T_1 \leq T \leq T_2$) in which crystallization of the synthetic resin can be effectively promoted, and maintained in such temperature range R. To this end, for example, it is preferred to control the heating output of the heater by the controller 24 to a relatively high level in the first stage (i.e., in the case of a heater having a maximum output of 2 kW, approximately 95% of the maximum output), and to a relatively low level in the second stage (i.e., in the case of a heater having a maximum output of 2 kW, approximately 70% of the maximum output). In this instance, it is readily possible to realize an optimum temperature control for crystallizing the neck portion 11 in a relatively short time, by a control of the heating output of the heater 22 by means of the controller 24. Incidentally, instead of changing the heating output of the heater 22 in a stepwise manner across the first stage to the second stage, it may be changed in a continuous manner.

In the second stage of crystallization treatment, in order to stably maintain the surface temperature T of the neck portion 11 within the above-mentioned temperature range R, in addition to the control of the heating output of the heater 22, air shower may be ejected from the air nozzle 23 and applied to the outer surface 11a of the neck portion 11. In this instance, since the shield 25 covers the opening 14 of the neck portion 11, it is possible to prevent air from flowing into the neck portion 11 and to reduce the temperature difference between the outer surface 11a and the inner surface 11b of the neck portion 11, thereby suppressing formation of wrinkles or the like surface defects in the opening 14 of the neck portion 11.

It has been experimentally confirmed in connection with preforms made of polyethylene terephthalate resin that, when the operations of the heater 22 and the air nozzle 23 are adequately controlled, the time required for crystallization of the neck portion 11 can be reduced by an amount up to approximately 30%, as compared with the above-mentioned prior art.

It will be appreciated from the foregoing description that the present invention provides a novel production technology for bottle-type synthetic resin containers, wherein crystallization step for the neck portion of the container can be carried out in a relatively short time.

It is needless to say that the present invention is not limited to the above-explained embodiment, and may be carried out with various modifications. Thus, for example, while the neck portion 11 has been explained as being subjected to crystallization before the biaxial stretching blow molding of the preform 10, in the above-explained embodiment, the neck portion 11 may be subjected to crystallization after the biaxial stretching blow molding of the preform 10.

What is claimed is:

1. An apparatus for producing bottle-type synthetic resin containers, comprising a heat treatment means for heating and crystallizing a neck portion of a preform corresponding to a neck portion of a container, wherein said heat treatment means is operated in a first stage so that said neck portion of the preform is temporarily heated thereby causing a temperature in said neck portion to elevate above a range in which crystallization of the synthetic resin is promoted and below a melting point of the synthetic resin, and in a second stage so that the neck portion is subsequently maintained at a temperature within the range in which crystallization of the synthetic resin is promoted.

2. The apparatus according to claim 1, wherein said heat treatment means comprises a heater and a control means for controlling a heating output of the heater so that the heating output is controlled to a relatively high level in the first stage of the heat treatment, and to a relatively low level in the second stage.

3. The apparatus according to claim 1, further comprising an air nozzle for applying an air shower to an outer surface at the neck portion of the preform, in the second stage of the heat treatment.

4. The apparatus according to claim 3, further comprising a shield for covering an opening of the neck portion, upon application of the air shower.

5. An apparatus for producing bottle-type polyethylene terephthalate resin containers, comprising a heat treatment means for heating and crystallizing a neck portion of a preform corresponding to a neck portion of a container, wherein said heat treatment means is operated in a first stage so that said neck portion of the preform is temporarily heated thereby causing a temperature in said neck portion to elevate to approximately 200° C. to 230° C., and in a second stage so that said neck portion is subsequently maintained at a temperature of approximately 170° C. to 195° C.

6. The apparatus according to claim 5, wherein said heat treatment means comprises a heater and a control means for controlling a heating output of the heater so that the heating output is controlled to a relatively high level in the first stage of the heat treatment, and to a relatively low level in the second stage.

7. The apparatus according to claim 5, further comprising an air nozzle for applying an air shower to an outer surface at the neck portion of the preform, in the second stage of the heat treatment.

8. The apparatus according to claim 7, further comprising a shield for covering an opening of the neck portion, upon application of the air shower.

9. The apparatus according to claim 1, wherein, prior to the operation of the heat treatment means, the neck portion is at a temperature that is below the range in which crystallization of the synthetic resin is promoted.

10. The apparatus according to claim 5, wherein, prior to the operation of the heat treatment means, the neck portion is at a temperature that is below the range in which crystallization of the synthetic resin is promoted.

* * * * *